R. R. PARRISH.
FLY CATCHING DEVICE.
APPLICATION FILED JULY 6, 1906.
908,032.
Patented Dec. 29, 1908.
3 SHEETS—SHEET 3.
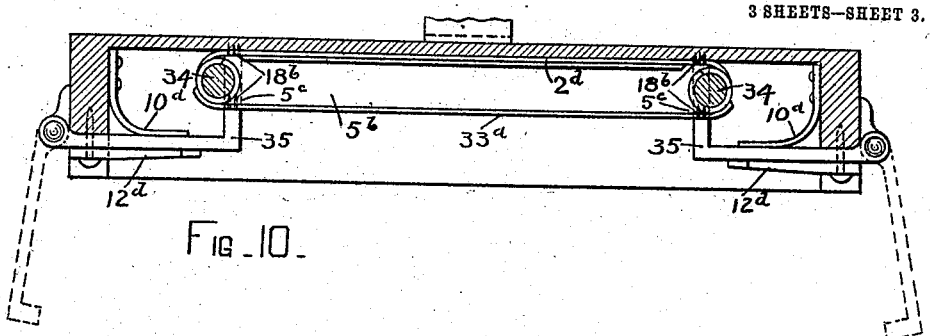
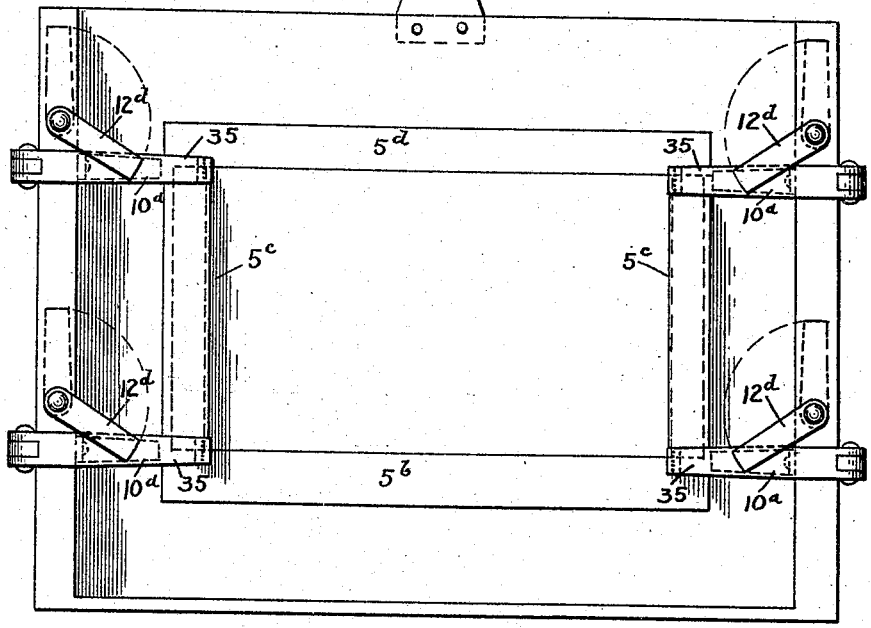
WITNESSES:
INVENTOR:

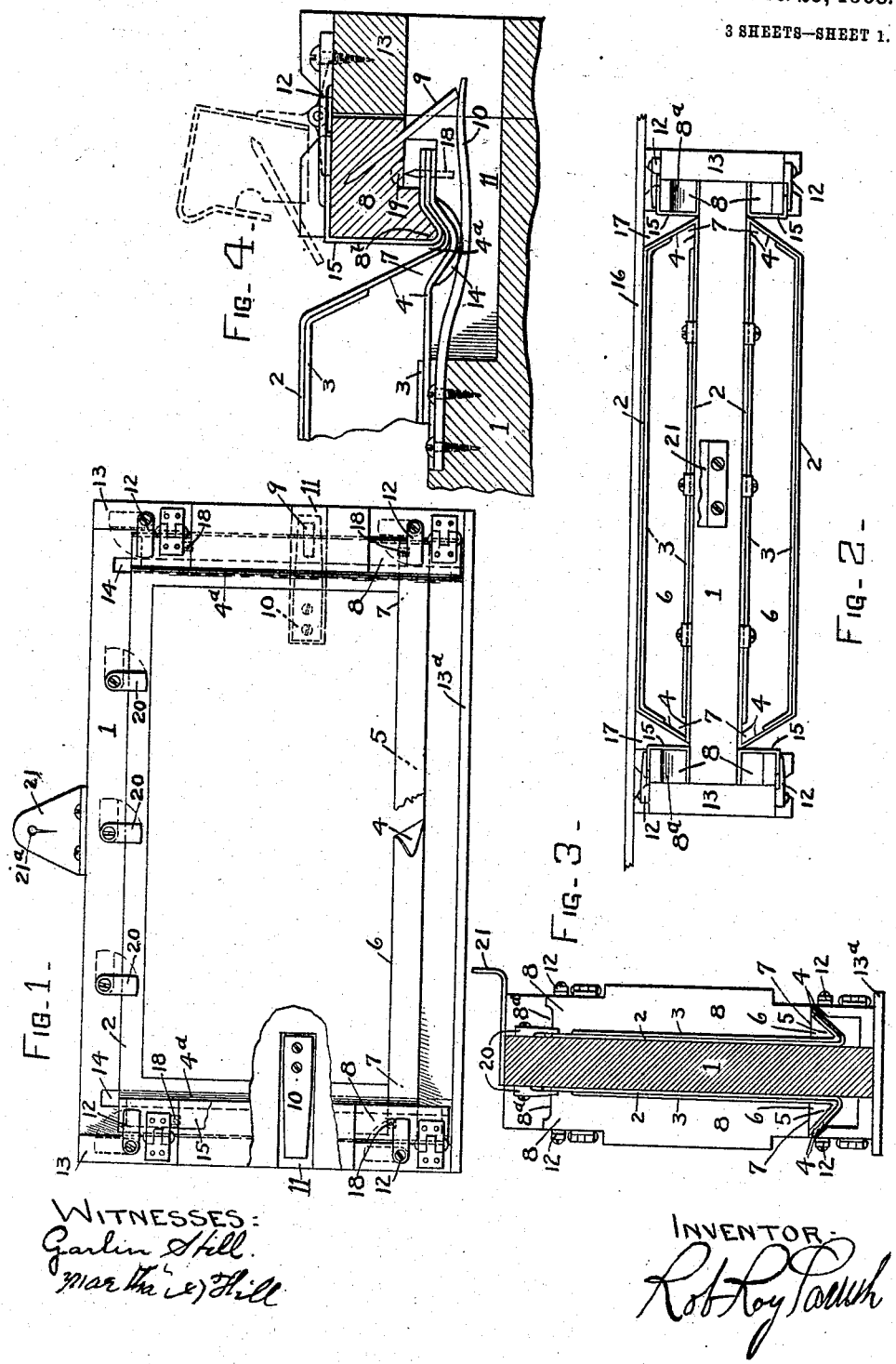

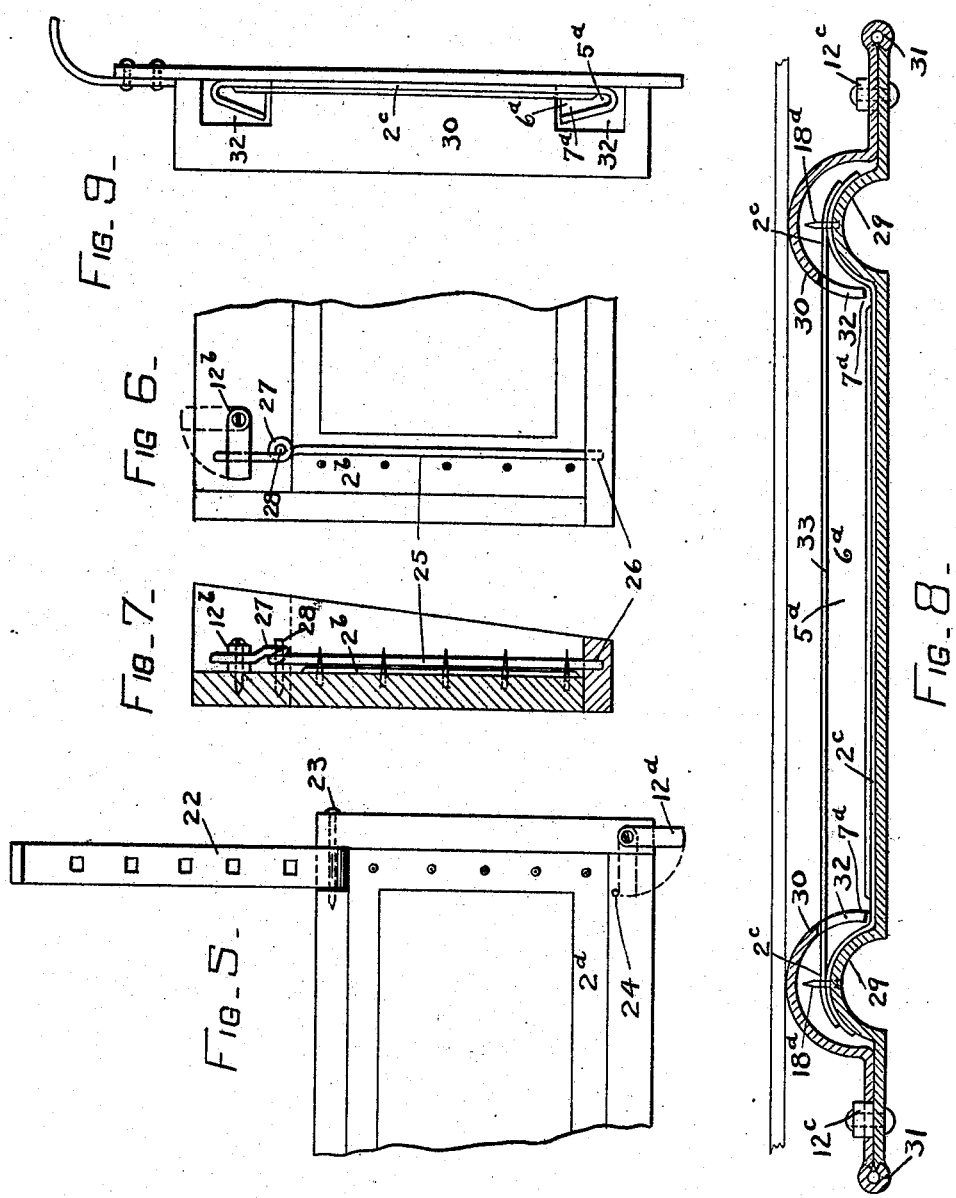

UNITED STATES PATENT OFFICE.

ROB ROY PARRISH, OF INDEPENDENCE, OREGON.

FLY-CATCHING DEVICE.

No. 908,032.   Specification of Letters Patent.   Patented Dec. 29, 1908.

Application filed July 6, 1906. Serial No. 324,963.

*To all whom it may concern:*

Be it known that I, ROB ROY PARRISH, a citizen of the United States, and a resident of the town of Independence, in the county of Polk and State of Oregon, have invented a new and useful Improvement in Fly-Catching Devices.

My invention relates to that class of devices designed to utilize a piece of pliant fabric prepared with a fly destroying substance, and having one edge folded to form a narrow trough with open top and closed ends.

The object of my invention is, first, to provide a convenient means for using at various positions a piece of fly paper having one edge folded to form a narrow gum trough with open top and closed ends; second, to enable a piece of fly paper to be used at different positions for catching flies on a pane of glass in a window without danger of the gummed surface of the paper daubing the glass. I attain these objects by means hereinafter set forth in this specification and represented in the accompanying drawings, in which, Figure 1 represents a vertical front view of my device. Fig. 2, a top view of same applied to a piece of glass. Fig. 3, a transverse sectional view of my device. Fig. 4, a sectional view of spring mechanism arranged to prevent the clamps from assuming closed positions, and also adapted to be used for pressing a piece of fly paper to the receptacle. Fig. 5, a clamp hinged at its end. Fig. 6, a removable rod clamp. Fig. 7, a transverse section of the rod clamping device. Fig. 8, a thin metallic device having curved clamps and applied to a piece of glass. Fig. 9, a transverse section of same device. Fig. 10, a piece of fly paper with its ends deflected inward and a gum trough formed with straight outer edge. Fig. 11, a clamp having trough nick and lugs. Fig. 12, a piece of fly paper having both ends deflected inward and gum troughs formed at both edges.

The device represented in Figs. 1, 2, 3, and 4 has its receptacle, 1, formed of wood as a location for a piece of fly paper, 2, prepared with its gummed surface, 3, and ungummed edges or margins, 4; the paper has one edge folded to form the narrow gum trough, 5, with its open top, 6, and closed ends, 7, which adapts it to catch downward flowing gum and also aid in catching flies. When desired a piece of fly paper may be arranged on the opposite side of the receptacle thereby enabling it to hold two pieces of fly paper, which is usually packed in pairs of sheets.

The device is provided with the clamps, 8, in which are inserted the clamp lugs, 9, that are adapted to contact with the springs, 10, which are screwed to the receptacle in such a manner as to permit the free ends of the springs working in the recess, 11, for the purpose of preventing the clamps from assuming their closed positions; these springs are also adapted to be used to press the paper to the receptacle where it is more firmly held by aid of the buttons, 12, which are screwed to the flange strips, 13; the buttons may be turned outward to their positions of release, and the clamps lifted by aid of the lifting nicks, 8, *a*; these clamps extend nearly across the receptacle and are provided with narrowed front edges 8, *b*, so as to enable them to deflectingly press the margin, 4, into the gum grooves, 14, and thereby make the gum gutters, 4, *a*, that are adapted to catch melted gum which may flow endwise when the device is placed in an endwise inclined position of use, and to prevent such gum from daubing the clamps, a piece of paper, 15, is placed with one edge under each clamp and another edge turned upwardly and placed between each clamp and its buttons. If the springs are arranged to press up against the clamps when held by the buttons the buttons are rendered less liable to displacement incidental to looseness caused by long usage, and such a combination will also enable the released clamps to automatically assume their outward positions.

The flange strips, 13, are nailed or otherwise suitably secured to the receptacle to strengthen it, and are here shown wide enough to constitute protecting factors when they properly contact with a piece of glass, 16, and there form the space, 17, which prevents the gummed portion, 3, of paper, 2, from contacting with and daubing the glass, 16.

To lessen danger of injury to the gum trough I prefer a flange strip, 13, *a*, placed at the lower edge of the receptacle, thus forming a flange rim on three edges of the receptacle. I prefer not to have a flange at the upper edge of the receptacle, in order to enable the protective factors and the glass to form at that edge a space which I designate a fly passage.

The pointed lugs, 18, are inserted in the receptacle so as to protrude and pierce through the paper when it is properly pressed down on to the receptacle, the points of the lugs being received in the lug holes, 19, made in the clamps; but the relative positions of the lugs and holes may be reversed and the lugs be carried by the clamps.

The margin guards, or stays, here used are the buttons, 20, screwed to the receptacle, 1, to prevent wind or other means from displacing the margin; the buttons are adapted to be turned to their positions of release, indicated by their dotted lines. Other means may be substituted for these buttons.

The manipulating handle, 21, is made of flexible leather, provided with the hole 21, a, and then screwed to the receptacle for manipulating purposes and can be utilized for hanging the device to a nail driven into a wall.

The device represented in Fig. 5, has an end hinged clamp, 22, secured to the receptacle by the hinge pin, 23, in such a manner as to enable the clamp to be turned down on the paper, 2, a, and be held in a clamping position between the rim, and the clamp pin, 24, by button, 12, a, or other means.

In Figs. 6 and 7 are represented sections of a device provided with removable rod clamps, 25, which are arranged so as to fit in the suitable recess 26 made in the rim, while another end is provided with the ring, 27, adapted to fit around the ring pin, 28; the clamp may be retained in position for pressing the paper, 2, b, to the receptacle by button, 12, b, or other means.

In Fig. 8 is represented a section of a thin metallic body part formed with the upward deflections, 29, from which the lug, 18, a, is struck up so as to pierce through the paper, 2, c, that is deflected to the receptacle by the curved clamps, 30, hinged at 31, so as to be held in their clamping positions by the buttons, 12, c, or other means. These clamps are provided with the trough nicks, 32, Figs. 8 and 9 thus enabling the gum trough, 5, a, with its open top, 6, a, and closed ends, 7, a, to be formed by folding one edge to a straight line, 33, in such a manner as to make a gum trough with a wider end portion than is normal with the devices heretofore described.

In Figs. 10, 11, and 12 is represented a device having a piece of fly paper, 2, d, having its ends deflected inward around a rod auxiliary, 34, so as to form a narrow gum trough, 5, b, when another edge is folded to a straight line, 33, a.

The clamps, 35, are provided with trough nicks, 32, a, and lugs, 18, b, at their edges, and are hinged to the upturned flanges so as to be forced down on the paper and be held there by the buttons, 12, d, or other means. Clamp springs, 10, a, are secured to the device so that when the buttons, 12, d, are turned to their positions of release, the springs will force the clamps up to, and normally hold them at their positions of release, see dotted lines. By such a position of the paper a paper gum stop or trough, 5, c, is formed at the ends of the paper, and when the upper edge is folded to form an additional gum trough, 5, d, Fig. 12, the paper forms a basin and normally prevents its flowing gum from daubing the receptacle when the device is placed in a highly inclined position edgewise.

The operation of my device is simple, convenient, and effective. By turning the buttons to their positions of release, and lifting the clamps outward, a piece of fly paper may be laid on the receptacle, the lugs forced through it, the margin guards placed over the margin, the clamps made to press the paper to the receptacle and the buttons turned over the clamps. Then by aid of the manipulating handle the device may be properly passed with the handle portion forward and the paper towards the glass in a window in such a manner that some flies which may get between the paper and glass by means of the fly passage or otherwise will be caught by the gummed portion, 3, of paper, 2, and the glass not be daubed by contacting with said portion, for the protective factors by contacting with the glass, will form the space, 17, and thus keep the glass and gummed portion apart. If the gum trough is formed before the device is applied to the glass, a rapid motion will tend to cause the gum trough to spread at its top so as to cause the edge of the gum trough to scrape the glass and more effectively aid in catching flies. After the window service the device may be by any suitable means placed in any desirable vertical or inclined position for displaying the paper to catch flies, or to conceal the gummed portion and dead flies, and the gum troughs when properly arranged will catch and normally retain any melted gum which may flow downward into them, and thereby prevent the melted gum from dropping onto and daubing articles beneath the device.

The device may be placed in a horizontal position for displaying the paper to catch flies, and when the weather is not warm enough to melt the gum the device may be turned with the paper in a horizontal position beneath the receptacle without danger of the gummed portion sagging so as to contact with the top of a table. If the heat is sufficient to cause the gum to rapidly melt and flow into the trough, the paper may be readily removed, the hitherto upper edge formed into a gum trough and the paper replaced on the receptacle so as to allow the melted gum to reflow towards the newly made gum trough, and if both troughs are retained the reflowing of the gum may be more readily managed by merely reversing the position of the device. The additional precaution of arranging gum stops or troughs at the end portions of the paper will enable it to be utilized at a highly inclined endwise position, or used in a horizontal position without danger of the melted gum normally flowing from the paper and daubing the receptacle or other articles, as the basin is deep enough to confine the gum. After a piece of paper has served its purpose it can be easily removed and another piece readily adjusted to the receptacle.

It is obvious that other modifications of my invention can be made of wood, sheet metal, wire, cloth, paper, and fabric, and I do not intend to confine myself to the few phases here represented, but Having described my invention, what I claim as new, and desire to secure by Letters Patent, is;

1. A fly catching device consisting of a suitable receptacle for a piece of fly paper combined with factors to form a fly passage, lugs to pierce said paper, and means to secure said paper to said receptacle, for the purpose set forth.

2. A fly catching device consisting of a suitable receptacle for a piece of fly paper, combined with factors to form a fly passage, lugs to pierce said paper, a margin guard, and means to secure said paper to said receptacle, for the purpose set forth.

3. A fly catching device consisting of a suitable receptacle provided with gum stops, combined with factors to form a fly passage, lugs to pierce said paper, and means to secure said paper to said receptacle, for the purpose set forth.

4. A fly catching device consisting of a suitable receptacle for a piece of fly paper, a piece of fly paper mounted on said receptacle having a narrow gum trough having an open top and closed ends arranged to catch downward flowing gum of said paper, and means to secure said paper to said receptacle, for the purpose set forth.

5. A fly catching device consisting of a suitable receptacle for a piece of fly paper, combined with factors to form a fly passage, lugs to pierce said paper, clamps to press said paper to said receptacle, means to hold said clamps at their positions of release, said means being also adapted to hold said clamps at their positions for pressing said paper to said receptacle, for the purpose set forth.

6. A fly catching device consisting of a suitable receptacle provided with gum stops located at the end portions of said receptacle, said stops being adapted to prevent gum from flowing off the ends of a piece of fly paper mounted on said receptacle, and means to secure said paper to said receptacle, for the purpose set forth.

7. A fly catching device consisting of a suitable receptacle provided with gum stops located at the end portions of said receptacle, said stops being adapted to prevent gum from flowing off the ends of a piece of fly paper mounted on said receptacle, combined with factors to form a fly passage, and means to secure said paper to said receptacle, for the purpose set forth.

8. A fly catching device consisting of a suitable receptacle for a piece of fly paper, a piece of fly paper having a gum trough made of paper, said trough having an open top and closed ends, and means to secure said paper to said receptacle, for the purpose set forth.

9. A fly catching device consisting of a suitable receptacle for a piece of fly paper, a piece of fly paper having a gum trough made of paper, said trough having an open top and closed ends, means to protect said trough, and means to secure said paper to said receptacle, for the purpose set forth.

10. A fly catching device consisting of a suitable receptacle for a piece of fly paper, a piece of fly paper mounted on said receptacle, within the confines of the same means to prevent gum flowing from said paper from daubing said receptacle, and means to secure said paper to said receptacle, for the purpose set forth.

11. A fly catching device consisting of a suitable receptacle for a piece of fly paper, a piece of fly paper mounted on said receptacle, within the confines of the same means to prevent gum flowing from said paper from daubing said receptacle, factors to form a fly passage, clamps arranged to press said paper to said receptacle, and means to secure said clamps against displacement, for the purpose set forth.

12. A fly catching device consisting of a suitable receptacle for a piece of fly paper, factors to form a fly passage, gum stops made of paper located at the end portion of said paper, clamps to press said paper to said receptacle, means to hold said clamps at their positions of release, said means being also adapted to hold said clamps at their positions of pressure, and further means to secure said clamps at their closed positions for the purpose set forth.

13. A fly catching device consisting of a suitable receptacle for a piece of fly paper, clamps adapted to secure said paper to said receptacle, and spring mechanism arranged to hold said clamps at their positions of release, for the purpose set forth.

14. A fly catching device consisting of a suitable receptacle for a piece of fly paper, a piece of fly paper having one edge folded to form a gum trough having open top and closed ends mounted on said receptacle, lugs to pierce said paper, a margin guard, protective flanges att hree edges of said receptacle, and means to secure said paper to said receptacle, for the purpose set forth.

15. A fly catching device consisting of a suitable receptacle for a piece of fly paper, a piece of fly paper having one edge folded to form a gum trough with open top and closed ends mounted on said receptacle, factors to form a fly passage, lugs to pierce said paper, and means to secure said paper to said receptacle, for the purpose set forth.

16. A fly catching device consisting of a suitable receptacle for a piece of fly paper, a piece of fly paper haivng one edge folded to form a gum trough mounted on said receptacle, factors to form a fly passage, a margin guard, and means to secure said paper to said receptacle, for the purpose set forth.

17. A fly catching device consisting of a suitable receptacle for a piece of fly paper, a piece of fly paper having a gum trough made of paper, said trough having an open top and closed ends, lugs to pierce said paper, a margin guard, gum stops located at the end portions of the said paper, flanges at three edges of said receptacle, and means to secure said paper to said receptacle, for the purpose set forth.

18. A fly catching device consisting of a suitable receptacle for a piece of fly paper, a piece of fly paper having a gum trough made of paper, said trough having an open top and closed ends, gum stops located at the end portions of said paper, and means to secure said paper to said receptacle, for the purpose set forth.

19. A fly catching device consisting of a suitable receptacle for a piece of fly paper, clamps provided with trough nicks suitably mounted on said device, and further means to secure said clamps at their closed positions.

20. A fly catching device consisting of a suitable receptacle, a piece of fly paper having a gum trough mounted on said receptacle, lugs to pierce said paper, clamps arranged to secure said paper to said receptacle, said clamps having trough nicks, for the purpose set forth.

ROB ROY PARRISH

Witnesses:
B. WILSON,
R. J. TAYLOR.